(12) United States Patent
Moran et al.

(10) Patent No.: US 9,798,909 B2
(45) Date of Patent: Oct. 24, 2017

(54) INTEGRATED CIRCUIT TO CONVERT NO-WIRE SIGNALS TO ONE-WIRE SIGNALS

(71) Applicant: Cypress Semiconductor Corporation, San Jose, CA (US)

(72) Inventors: Douglas Moran, Carlsbad, CA (US); Mark R. Whitaker, Colorado Springs, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/281,677

(22) Filed: Sep. 30, 2016

(65) Prior Publication Data

US 2017/0103240 A1    Apr. 13, 2017

Related U.S. Application Data

(60) Provisional application No. 62/238,504, filed on Oct. 7, 2015.

(51) Int. Cl.
*H04Q 5/22* (2006.01)
*G06K 7/10* (2006.01)
*H04L 5/00* (2006.01)
*H04B 5/00* (2006.01)

(52) U.S. Cl.
CPC ....... *G06K 7/10366* (2013.01); *H04B 5/0062* (2013.01); *H04L 5/0055* (2013.01)

(58) Field of Classification Search
CPC . G06K 7/10366; H04B 5/0062; H04L 5/0055
USPC ...................................................... 340/10.4
See application file for complete search history.

(56) References Cited

U.S. PATENT DOCUMENTS

| 7,443,805 B1 * | 10/2008 | Bynum ............... H04L 41/0816 370/254 |
| 7,616,117 B2 | 11/2009 | Streeb et al. |
| 9,050,379 B2 | 6/2015 | Selker et al. |
| 9,147,013 B2 | 9/2015 | Mena et al. |
| 9,306,637 B2 | 4/2016 | Kuhl et al. |

(Continued)

FOREIGN PATENT DOCUMENTS

JP          05977521 B2    8/2016

OTHER PUBLICATIONS

Extend Active RFID With A ZigBee Network, microwaves&rf.com, Nov. 2, 2015.

(Continued)

*Primary Examiner* — Omer S Khan

(57) ABSTRACT

A radio frequency identification (RFID) integrated circuit includes a transceiver and a processing device. The transceiver may to transmit a first continuous wave radio frequency (RF) signal to a bridge in a no-wire format via an antenna, where the transceiver is to start transmitting the modulated or continuous wave RF signal at a first amplitude value and increase an amplitude of the modulated or continuous wave RF signal to a second amplitude value at which an acknowledge (ACK) pulse is detected. The transceiver may receive a reflected wave RF signal in the no-wire format. The processing device may detect the ACK pulse in the reflected wave RF signal. The processing device may transmit a second modulated or continuous wave RF signal to the transceiver in the no-wire format.

14 Claims, 9 Drawing Sheets

(56) References Cited

U.S. PATENT DOCUMENTS

| | | |
|---|---|---|
| 9,361,568 B2 | 6/2016 | Butler et al. |
| 2003/0104848 A1 | 6/2003 | Brideglall |
| 2009/0094492 A1* | 4/2009 | Music .................. G06F 11/261 |
| | | 714/715 |
| 2009/0146783 A1* | 6/2009 | Forster ............... G06K 7/10178 |
| | | 340/10.1 |
| 2009/0256679 A1 | 10/2009 | Potyrailo et al. |
| 2012/0007723 A1* | 1/2012 | Whitaker ........... G06K 19/0709 |
| | | 340/10.51 |
| 2015/0130593 A1 | 5/2015 | Mats et al. |
| 2015/0227480 A1 | 8/2015 | Whitaker et al. |
| 2015/0381314 A1* | 12/2015 | Tomisawa ............. H04L 1/1819 |
| | | 714/776 |

OTHER PUBLICATIONS

GammaTage®—Gamma-Radiation-Resistant RFID Tags, verigenetics.com; 1 page.
International Search Report for International Application No. PCT/US16/55531 dated Feb. 7, 2017; 4 pages.
Written Opinion of the International Searching Authority for International Application No. PCT/US16/55531 dated Feb. 7, 2017; 7 pages.

* cited by examiner

```
                    ┌─────────────┐
                    │    START    │
                    └──────┬──────┘
                           ▼
┌──────────────────────────────────────────────────────────┐
│ Receive the continuous wave RF signal received on the    │─ 610
│ first pin from the master device                         │
└──────────────────────────┬───────────────────────────────┘
                           ▼
┌──────────────────────────────────────────────────────────┐
│ Convert a bit stream of the continuous wave RF signal    │─ 620
│ from a no-wire format to a one-wire format               │
└──────────────────────────┬───────────────────────────────┘
                           ▼
┌──────────────────────────────────────────────────────────┐
│ Communicate the bit stream in the one-wire format on the │─ 630
│ second pin to a one-wire device on a one-wire bus        │
└──────────────────────────┬───────────────────────────────┘
                           ▼
┌──────────────────────────────────────────────────────────┐
│ Determine a timing window to communicate response data   │─ 640
│ with the master device                                   │
└──────────────────────────┬───────────────────────────────┘
                           ▼
┌──────────────────────────────────────────────────────────┐
│ Reflect the continuous wave RF signal using a            │
│ backscatter technique to communicate the response data   │─ 650
│ to the master device within the timing window            │
└──────────────────────────┬───────────────────────────────┘
                           ▼
                    ┌─────────────┐
                    │   FINISH    │
                    └─────────────┘
```

FIG. 6

INTEGRATED CIRCUIT TO CONVERT NO-WIRE SIGNALS TO ONE-WIRE SIGNALS

CROSS-REFERENCE TO RELATED APPLICATION

The application claims the benefit of U.S. Provisional Application No. 62/238,504, filed Oct. 7, 2015, which is incorporated by reference herein in its entirety.

TECHNICAL FIELD

This disclosure relates to the field of radio frequency (RF) communication and, in particular, to a no-wire RF communication system.

BACKGROUND

One-wire devices may use a single wire to provide power and communicate data. The one-wire devices may be small, inexpensive devices and may be used in conjunction with single-use products. The one-wire devices may also be sterilized using gamma rays to reduce or eliminate pathogens adhering to a surface of the one-wire devices and spreading disease. For example, hospitals may use one-wire devices to identify single-use items used in medical procedures where the one-wire device is sterilized to minimize a reduce a spread of disease in the hospital. The one-wire device is designed for communication with another device over a single wire.

BRIEF DESCRIPTION OF THE DRAWINGS

The present disclosure is illustrated by way of example, and not by way of limitation, in the figures of the accompanying drawings.

FIG. 6 depicts a flow diagram of one example of a method for determining a timing window to communicate a no-wire format from communication in an RFID system according to one embodiment.

DETAILED DESCRIPTION

Figures 1A, 1B:
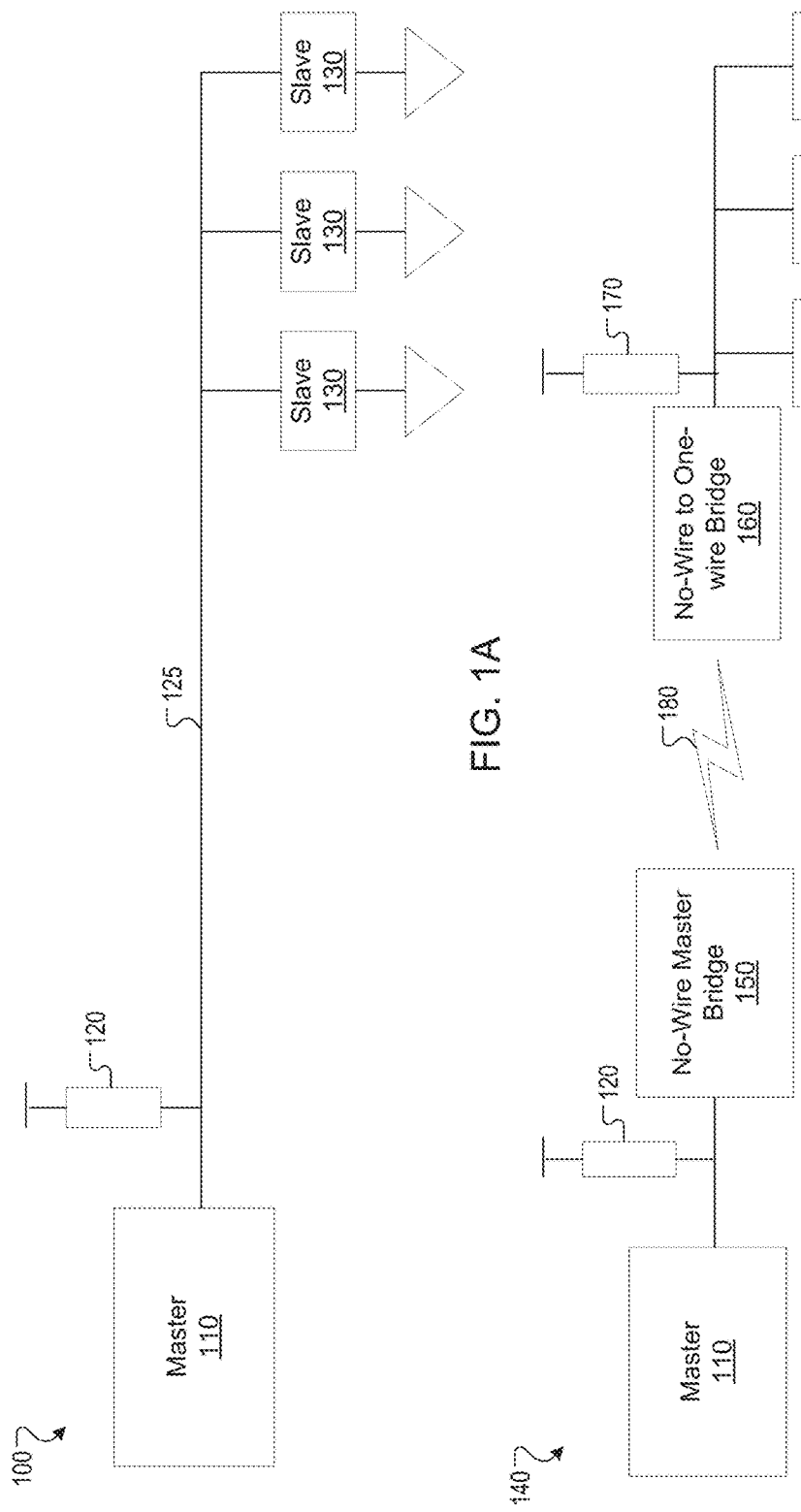
FIG. 1A illustrates a one-wire system including a master device and slave devices according to one embodiment.
FIG. 1B illustrates a one-wire system that includes a no-wire master bridge and a no-wire to one-wire bridge according to one embodiment.

Single-use products may be used in a variety of industries, such as consumer product industries, medical industries, and safety industries that consume single-use products. In the medical industry, for example, the volume of single-use medical products consumed each may exceed hundreds of millions of products. Single-use products are attractive to counterfeiters seeking to sell counterfeit products. However, the quality of counterfeit products may be compromised, putting consumers in danger and damaging the brand of the legitimate products. To avoid the use of counterfeit products, authentication methods may be used to ensure that the single-use products are authentic. However, high-volume, single-use products are typically low-cost products that cannot support costly add-on anti-counterfeit devices.

One-wire devices may be used as anti-counterfeit devices. The one-wire systems may be simple devices that are inexpensive and provide power and communicate data via a single wire. A one-wire system may include a master device and one or more slave devices coupled to the master device. The master device may initiate and control the wire (also referred to as a bus) used to communicate with the slave devices.

The master device may be attached to a reusable product or an authentication device. The slave devices may be small inexpensive devices that may be attached to single-use products. For example, the master device may be integrated into a pump housing of a medical infusion device and the slave device may be affixed to a single-use infusion kit. The master device at the pump housing may authenticate the slave device affixed to the infusion kit.

Use of the wire in the one-wire systems may be problematic for many medical products since these products must be sterilized via a gamma sterilization procedure prior to use. The wire between the master device and the slave devices provides another surface for pathogens to adhere. Additionally, for environments where the slave device is located at a relatively far distance from the master device, the single wire may create a safety hazard.

The embodiments described herein may address the above-noted problems by providing an integrated circuit that converts no-wire signals to one-wire signals so that a one-wire device can wirelessly communicate with a master device. In one embodiment, a wireless system may include a no-wire master bridge that may be coupled to a master device and a no-wire to one-wire bridge (also referred to herein as a no-wire to one-wire bridge) that may be coupled to slave devices using a single wire but wirelessly communicate with the no-wire master bridge. The no-wire master device may receive a signal from the master device in a one-wire format. The no-wire master bridge may convert the signal into a no-wire format and communicate the signal to the no-wire to one-wire bridge. The no-wire to one-wire bridge may harvest energy from the continuous wave RF signal and use it as a local power source. The no-wire to one-wire bridge can also provide this harvested power to the associated one-wire devices.

The no-wire to one-wire bridge may demodulate the signal and convert the signal to a bit stream in a one-wire format. The no-wire to one-wire bridge may send the bit stream to the slave device. The slave device may decode the bit stream to identify an instruction sent from the master device and execute the instruction. The no-wire to one-wire bridge may also include a memory device that uses ferroelectric random access memory (F-RAM) to store data or instructions. While a gamma radiation sterilization process may cause a memory of a conventional device to be erased, the F-RAM may be immune to gamma radiation and maintain the data stored in the memory during and after the gamma sterilization process. In response to the execution of the instruction, the no-wire to one-wire bridge may receive a signal from the slave device in a one-wire format. The no-wire to one-wire bridge may convert the signal into a no-wire format and reflect the signal via backscatter to the no-wire master bridge. The no-wire slave master may demodulate the signal and convert the signal to a bit stream in a one-wire format. The no-wire master bridge can send the bit stream to the master device. The master device may decode the bit stream to identify data sent from the slave device.

FIG. 1A illustrates a one-wire system 100 including a master device 110 and a plurality of one-wire slave devices 130 according to one embodiment. The master device 110 or the one-wire slave devices 130 may be part of a system on a chip (SoC) or a microprocessor. The master device 110 and the one-wire slave device 130 may be coupled to a common bus 125. The master device 110 may direct communication of signals between the master device 110 and the one-wire slave device 130 over the common bus 125. In one example, the master device 110 may direct the communication of the signals to avoid a collision of the signals over the common bus 125, as the common bus 125 is a single wire that may not carry multiple signals at the same time.

In another example, multiple slave devices may be coupled to the common bus 125. For example, the master device 110 may initiate communication with a first slave device by sending a signal over the common bus 125 to the first slave. The signal may include an identifier to indicate that the signal is to be received by the first slave device. The first slave device may decode the signal and execute the instruction. When the instruction includes sending a response signal to the master device 110, the first slave may send the response signal to the master device 110 over the common bus 125.

In one embodiment, the one-wire slave device 130 may also derive energy from the signal to power one or more components of the one-wire slave device 130, such as a processing device or a state machine that executes the instructions encoded in the signal. In another embodiment, the one-wire system 100 may include a pull-up resistor 120 that may be coupled to the common bus 125. The pull-up resistor 120 may pull the common bus 125 up to a voltage threshold, such as 3 volts, and may provide power to the one-wire slave device 130. The number of one-wire slave devices 130 in the one-wire system 100 is not intended to be limiting. The one-wire system 100 may include one one-wire slave device 130 or multiple one-wire slave devices.

FIG. 1B illustrates a one-wire system 140 that includes a no-wire master bridge 150 and a no-wire to one-wire bridge 160 according to one embodiment. Some of the features in FIG. 1B are the same or similar to the some of the features in FIG. 1A as noted by same reference numbers, unless expressly described otherwise. The master device 110 may be coupled to the no-wire master bridge 150.

The master device 110 may send the no-wire master bridge 150 a signal in a one-wire format. The no-wire master bridge 150 may convert the signal to a no-wire format and send the signal to the no-wire to one-wire bridge 160 over a wireless communication channel 180.

The no-wire slave bridge 160 may receive the signal, demodulate the signal to generate a bit stream, and convert the bit stream to a one-wire format. In one embodiment, the no-wire to one-wire bridge 160 may be a standalone device. In another embodiment, the no-wire to one-wire bridge 160 may send the bit stream to one or more of the slave devices. The one-wire slave device 130 may decode the bit stream to determine an instruction and then execute the instruction. When the instruction includes sending a response message to the master device 110, the one or more one-wire slave devices 130 may generate a bit stream in a one-wire format and send the bit stream to the no-wire to one-wire bridge 160.

The no-wire to one-wire bridge 160 may convert the bit stream to a no-wire format and reflect the signal to communicate the bit stream to the no-wire master bridge 150. The no-wire master bridge 150 may receive the signal and demodulate the signal to generate a bit stream in a no-wire format. The no-wire master bridge 150 may convert the bit stream in the no-wire format to a one-wire format and send the bit stream to the master device 110. The master device 110 may decode the bit stream to reproduce the response message sent from the one-wire slave device 130.

In one embodiment, the no-wire master bridge 150 may be an RFID reader and the no-wire to one-wire bridge 160 may be an RFID tag. The number of one-wire slave devices 130 in the one-wire system 140 is not intended to be limiting. The one-wire system 140 may include a single one-wire slave device 130 or multiple slave devices.

In one embodiment, the no-wire master bridge 150 and the no-wire to one-wire bridge 160 may use a high frequency (HF) band, such as approximately 13.56 megahertz (MHz), when communicating signals. In another embodiment, the no-wire master bridge 150 and the no-wire to one-wire bridge 160 may use an ultra-high frequency (UHF) band, such as approximately 856 MHz to 960 MHz, when communicating signals. The no-wire master bridge 150 and the no-wire to one-wire bridge 160 may also communicate in a near-field environment. The bands and environments that the master bridge 150 and the no-wire to one-wire bridge 160 use are not intended to be limiting. For example, the master bridge 150 and the no-wire to one-wire bridge 160 may use other bands, such as low-frequency bands, and communicate in far-field environments.

Figure 2:
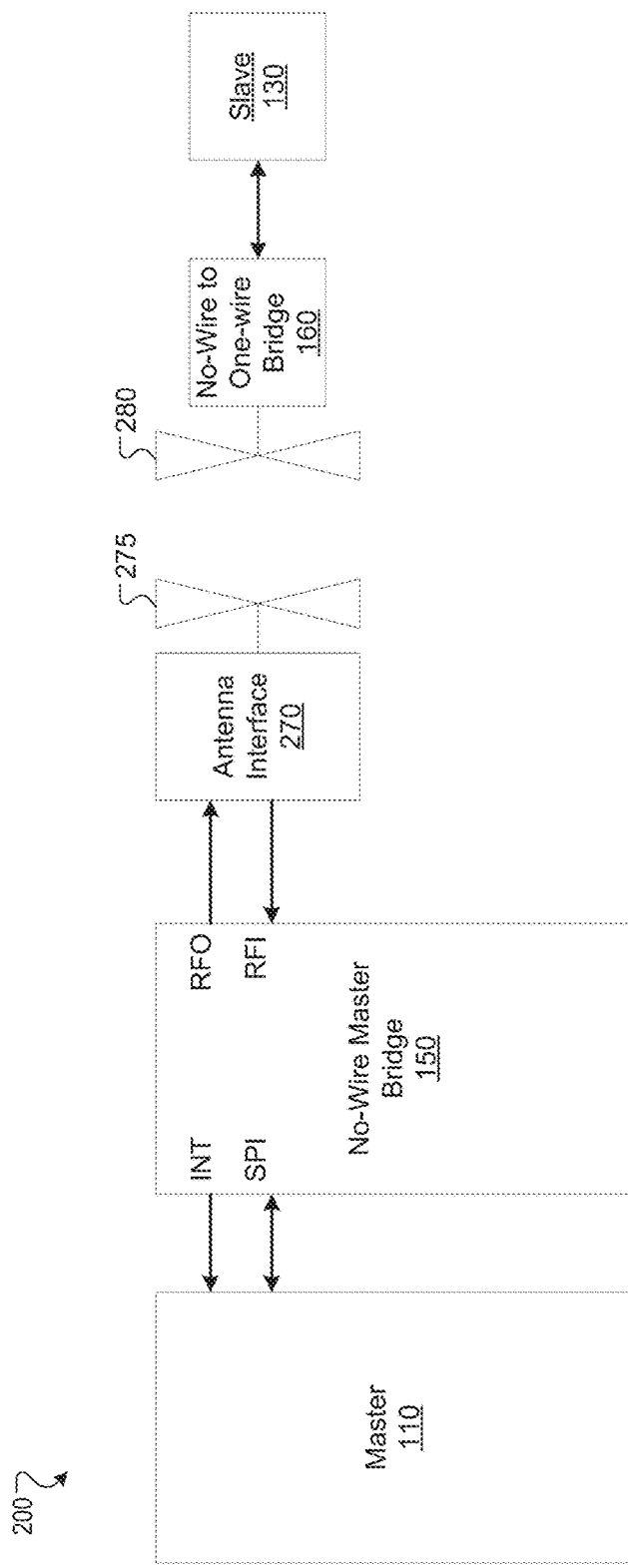
FIG. 2 illustrates a no-wire system that includes a no-wire master bridge coupled to an antenna interface with an antenna and a no-wire to one-wire bridge coupled an antenna according to one embodiment.

FIG. 2 illustrates a one-wire system 200 that includes a no-wire master bridge 150 coupled to an antenna interface 270 with an antenna 275 and a no-wire to one-wire bridge 160 coupled an antenna 280 according to one embodiment. Some of the features in FIG. 2 are the same or similar to the some of the features in FIGS. 1A and 1B as noted by same reference numbers, unless expressly described otherwise. The no-wire master bridge 150 may include general purpose input/output (GPIO) pins. For example, the GPIO pins may include a serial data input (SPI) pin and an interrupt (INT) pin coupled to the master device 110 and a radio frequency output (RFO) pin and a radio frequency input (RFI) pin coupled to an antenna interface 270. The antenna interface 270 may be an interface that connects the no-wire master bridge 150 to an antenna 275, such as an RFID antenna. The no-wire master bridge 150 can send a signal to the antenna interface 270 to be transmitted via the RFID antenna 275. An antenna 280 can be coupled to the no-wire to one-wire bridge 160 and the no-wire to one-wire bridge 160 can receive the signal via the antenna 280. In one embodiment, when the antenna 280 is an RFID antenna, in order to transmit a signal back to the no-wire master bridge 150 the no-wire to one-wire bridge 160 may use backscatter to reflect the signal in order to communicate data.

Backscatter communication may occur when the no-wire to one-wire bridge changes an impedance at antenna 280 so that the no-wire master bridge 150 may detect two different reflection states, such as an "ON" state (as referred to as a "transmitting" state) to communicate a signal representing a one value and an "OFF" state (also referred to as a "suppressed" state) to communicate a signal representing a zero value.

Figure 3A:
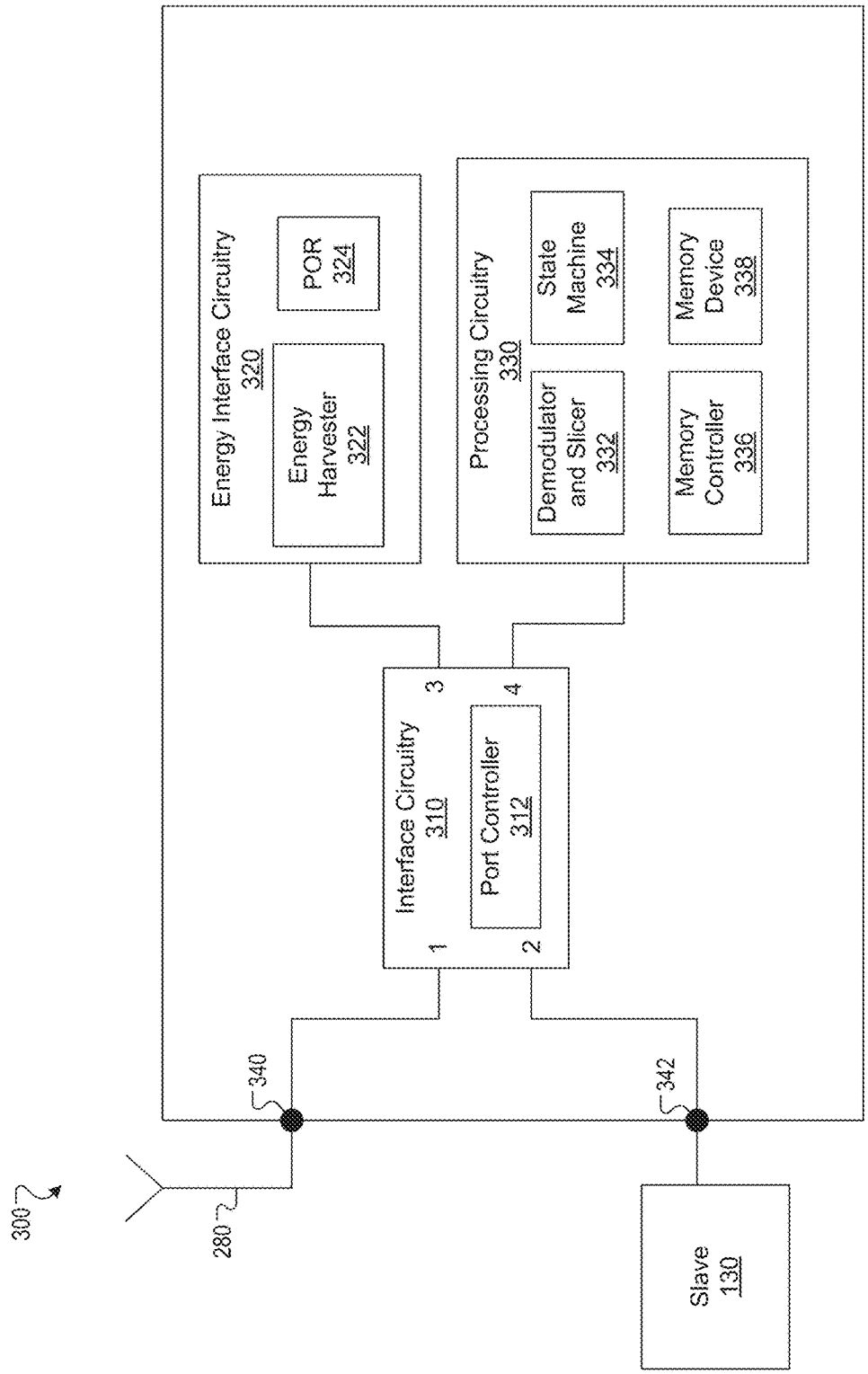
FIG. 3A illustrates a no-wire to one-wire bridge with interface circuitry, energy interface circuitry, and processing circuitry according to one embodiment.

FIG. 3A illustrates a no-wire to one-wire bridge 300 with interface circuitry 310, energy interface circuitry 320, and processing circuitry 330 according to one embodiment. Some of the features in FIG. 3A are the same or similar to the some of the features in FIGS. 1A, 1B, and 2 as noted by same reference numbers, unless expressly described otherwise. In one embodiment, the no-wire to one-wire bridge 300 may be an RFID system that includes the interface circuitry 310, the energy interface circuitry 320, and the processing circuitry 330. The interface circuitry 310 may interconnect one or more components integrated into the no-wire to one-wire bridge 300 or coupled to the no-wire to one-wire bridge 300. The interface circuitry may include a port controller 312 to reflect the signal in order to communicate data sent from the processing circuitry 330.

The interface circuitry 310 may include a first terminal (1), a second terminal (2), a third terminal (3), and a fourth terminal (4). The first terminal (1) may be coupled to a first pin 340. The first pin 340 may be coupled to the antenna 280. The second terminal (2) may be coupled to a second pin 342. The second pin 342 may be coupled to one or more slave devices 130. The first pin 340 and the second pin may be general-purpose input/output (GPIO) pins. The third terminal (3) may be coupled to the energy interface circuitry 320. The fourth terminal (4) may be coupled to the processing circuitry 330.

The energy interface circuitry 320 may include an energy harvester circuit 322 that may derive energy received from a modulated or continuous wave RF signal at the antenna 280. The energy interface circuitry 320 may include a power-on reset (POR) generator that generates a reset signal when power is applied to the energy interface circuitry 320.

The processing circuitry may include a demodulator and slicer 332. The demodulator and slicer 332 may extract a bit stream from the modulated or continuous wave RF signal received via the antenna 280. The state machine 334 may decode the bit stream. In one embodiment, the demodulator and a slicer may be integrated into the same circuit element. The demodulator produces a signal with high and low voltage levels. The slicer may determine a midpoint between the high and the low that is used to create binary signals.

The state machine 334 may decode the demodulated signal to determine an instruction to execute. For example, the instruction may be encoded by a master device 110 in FIG. 1 according to a system protocol. The demodulator and slicer 332 may produce a binary bit stream and communicate the binary bit stream to the state machine 334. The state machine 334 may identify a sequence of bits in the bit stream correlating to an instruction. In one example, a first bit sequence of 0111 may correlate to an instruction for a memory write. A second bit sequence following the first bit sequence may correlate to an address in memory to write data. A third bit sequence following the second bit sequence may correlate to a data pattern to be written to the address in the memory. In another example, a fourth bit sequence of 1010 may correlate to an instruction to open a port at the no-wire to one-wire bridge 300 to a one-wire slave and communicate a fifth bit sequence, such as remaining bits in the binary bit stream.

The instruction may be an instruction to match a device address, an instruction to set an operating state, an instruction to store data, or an instruction to retrieve data from the memory device 338. When there are more than one one-wire slaves connected to the no-wire to one-wire bridge 300, each slave 130 may have a unique identity for a master device ### to distinguish each slave device 130. The instruction to match a device address may include matching a unique identifier for a slave with an instruction from the master device ### that identifies a slave device 130. When the state machine 334 matches unique identifier with the slave device 130 identified in the instruction, the state machine 334 may continue to decode the remainder of the instruction. When the state machine 334 may not find a unique identifier matching the slave device 130 identified in the instruction, the state machine 334 may not decode any other instructions.

The memory device 338 may include a ferroelectric random access memory (F-RAM) memory to that has immunity to gamma radiation, such as the gamma radiation used for sterilization. The F-RAM memory may also provide symmetric read and write characteristics for timing and power.

In one embodiment, the energy harvester circuit 322 may harvest energy simultaneously or in parallel to the processing circuitry 330 extracting a bit stream from the signal. In another embodiment, the signal received at the antenna 280 may be in a no-wire format. The state machine 334 may convert the signal to a one-wire bit stream to send, via the interface circuitry 310, to the one or more one-wire slave devices 130. The memory controller 336 may determine a location in a memory device 338 to store or retrieve data associated with the execution of the instruction.

Figure 3B:
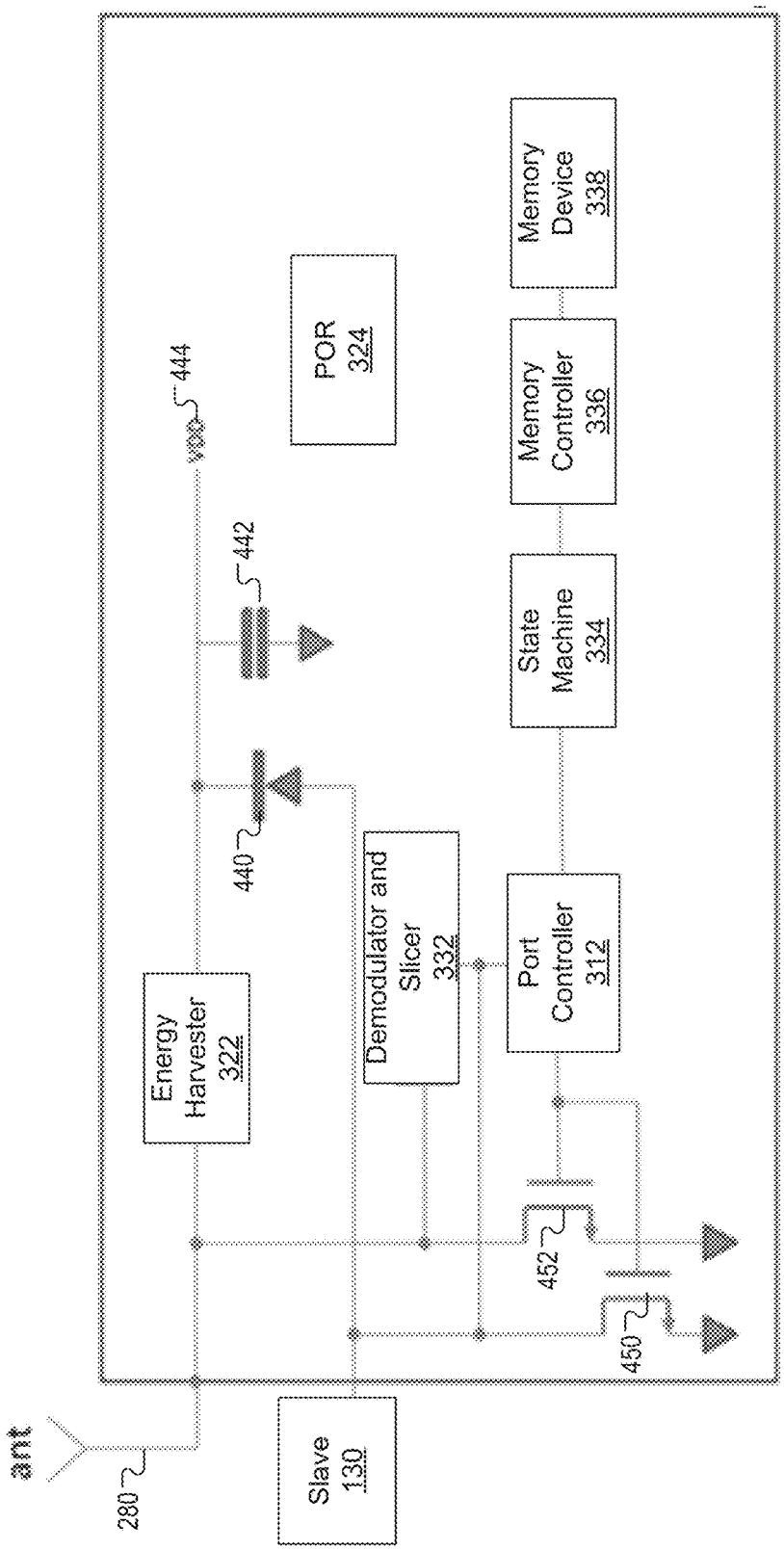
FIG. 3B illustrates a circuit level diagram of the no-wire to one-wire bridge in FIG. 3A according to one embodiment.

FIG. 3B illustrates a circuit level diagram of the no-wire to one-wire bridge 300 in FIG. 3A according to one embodiment. Some of the features in FIG. 3B are the same or similar to the some of the features in FIGS. 1A, 1B, 2, and 3A as noted by same reference numbers, unless expressly described otherwise. The antenna 280 may be coupled to the energy harvester circuit 322 and the demodulator and slicer 332. The energy harvester may be coupled to a diode 440 and a capacitor 442 to create a local operating voltage (VDD) 444. In one example, the modulating or continuous RF signal may be a repetitive signal, with a positive portion above a zero voltage baseline and a negative portion below a zero voltage baseline. The diode 440 may pass the positive portion of the wave to the capacitor 442 and block the negative portion so that the negative does not subtract from the positive portion. The capacitor 442 may provide storage for positive portions of the signal to accumulate and generate an operational power supply. The capacitor may store at least a portion of the energy harvested by the energy harvester. The port controller 312 may be coupled between the demodulator and slicer 332 and a state machine 334. The port controller 312 may also be coupled to a pull-down NFET with switches 450 and 452 to shunt the antenna 280 to change an impedance of the antenna 280. The state machine may be coupled to the memory controller 336. The memory controller may be coupled to a memory device 338.

Figure 4:
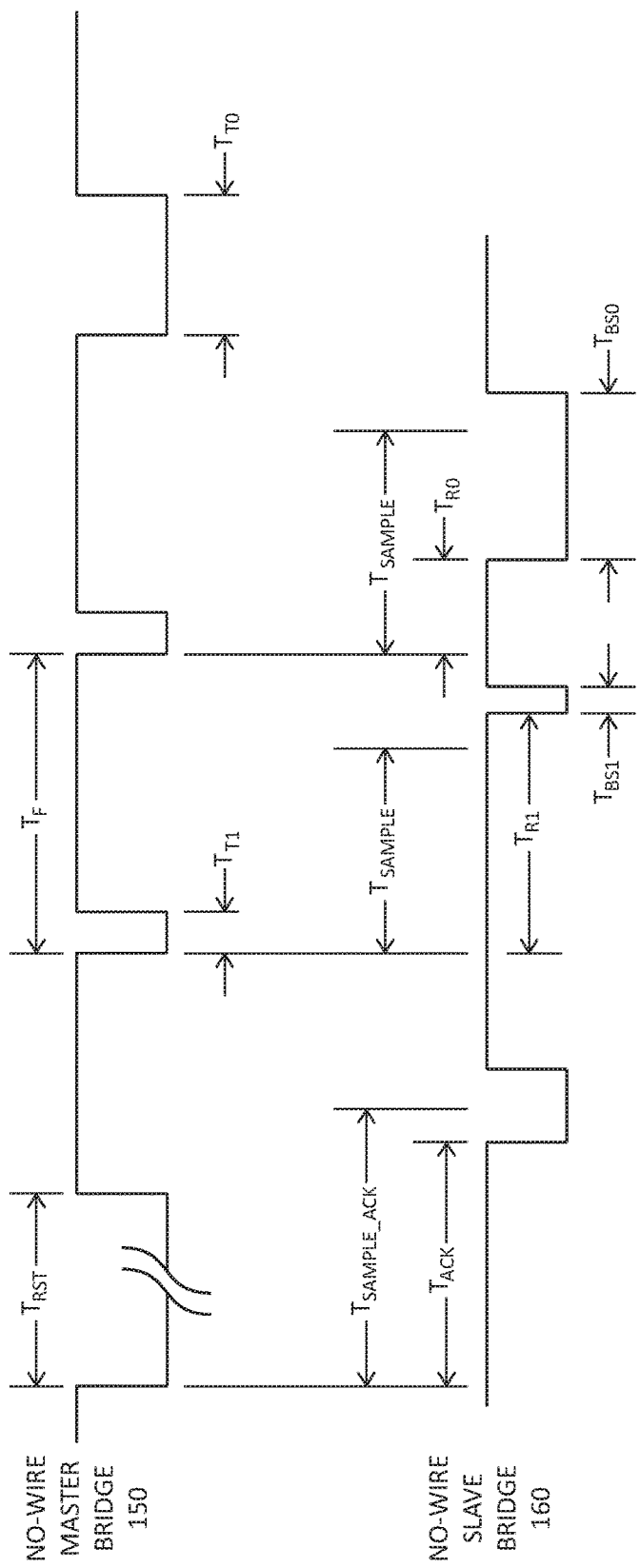
FIG. 4 illustrates timing parameters for the no-wire master bridge and the no-wire to one-wire bridge of FIG. 1A to communicate signals according to one embodiment.

FIG. 4 illustrates timing parameters for the no-wire master bridge 150 and the no-wire to one-wire bridge 160 of FIG. 1A to communicate signals, according to one embodiment. The table 1 below defines the timing parameters used by the no-wire master bridge 150 and the no-wire to one-wire bridge 160.

TABLE 1

| Parameter | Description |
| --- | --- |
| $T_F$ | Duration of the frame |
| $T_{RST}$ | Duration of the low Reset pulse |
| $T_{ACK}$ | The delay from reset start to tag acknowledge |
| $T_{SAMPLE\_ACK}$ | The time at which the ACK is sampled by the host |
| $T_{T1}$ | Transmit low duration for a 1 signal |
| $T_{T0}$ | Transmit low duration for a 0 signal |
| $T_{R1}$ | Tag response delay for a 1 signal |
| $T_{R0}$ | Tag response delay for a 0 signal |
| $T_{BS1}$ | Tag low interval for a 1 signal |
| $T_{BS0}$ | Tag low interval for a 0 signal |
| $T_{SAMPLE}$ | The time at which data bits are sampled by the host |

In one embodiment, the timing parameters may be defined periods of time, such as predefined periods of time by a system administrator. In another embodiment, the timing parameters may be set to mimic timing parameters of a one-wire protocol.

In one embodiment, the no-wire master bridge 150 may send a signal to the no-wire to one-wire bridge 160. When the no-wire to one-wire bridge 160 receives the signal, the no-wire to one-wire bridge 160 may perform a power-on reset (POR) process and send an acknowledgment (ACK) pulse back to the no-wire master bridge 150 within the $T_{SAMPLE\_ACK}$ period. The no-wire master bridge 150 may transmit a signal representing a 1 within a duration of a frame ($T_F$) for a period of $T_{T1}$. The no-wire master bridge 150 may transmit a signal representing a 0 within a duration of a frame ($T_F$) for a period of $T_{T0}$. The no-wire to one-wire bridge 160 may send a signal representing a zero within the $T_{SAMPLE}$ period for a transmission duration of $T_{BS0}$. The no-wire to one-wire bridge 160 may send a signal representing a one within the $T_{SAMPLE}$ period for a transmission duration of $T_{BS1}$.

The timing parameters may include a starting point and a communication window. In one embodiment, the no-wire to one-wire bridge 160 may use a delay chain to generate a communication window (also referred to as a time base) to indicate a window of time that the no-wire to one-wire bridge 160 may communicate signals. The delay chain may be triggered on a rising edge of the signal sent from the no-wire master bridge and generate timing edges to produce the ACK pulse. The delay chain may use a relatively low power to generate the communication window.

In one embodiment, the no-wire to one-wire bridge 160 may include a low-power oscillator to generate a communication window (also referred to as a time base) to indicate a window of time that the no-wire to one-wire bridge 160 may communicate signals. An operating voltage of the no-wire to one-wire bridge 160 may correlate to an oscillating frequency of the low-power oscillator that sets a timing window to backscatter the modulated or continuous wave RF signal For example, when a threshold voltage level is reached and the no-wire to one-wire bridge 160 is operational, the frequency that the low-power oscillator uses correlates to the threshold voltage level. The no-wire to one-wire bridge 160 may generate the communication window based on the frequency of the low-power oscillator. The no-wire to one-wire bridge 160 may be configured to operate at a threshold voltage level that correlates to a given frequency and enable the no-wire to one-wire bridge 160 and the no-wire master bridge 150 communicate within the same communication window.

In another embodiment, the no-wire to one-wire bridge 160 may include a low-power delay element or a series of low-power delay elements to generate the communication window to indicate a window of time that the no-wire to one-wire bridge 160 may communicate signals. For example, the low-power delay elements may include a 1 micro-second delay element and a 1.75 micro-second delay element to generate timing sequences for the communication window.

In one embodiment, the low-power oscillator may generate a communication window that fits with a minimum length of time and a maximum length of time. For example, the low-power oscillator may not generate an absolutely accurate time base, but may generate a sufficiently accurate communication window that satisfies minimum and maximum timing parameters. A port controller of the no-wire to one-wire bridge 160 may further define a beginning of the timing window as a third period of time beginning a point in time that the no-wire to one-wire bridge 160 receives a signal from the no-wire master bridge 150. The timing parameters and timing window in FIG. 4 is not intended to be limiting. The timing parameters may vary in types and values and the timing window may span various amount of time.

Figure 5:
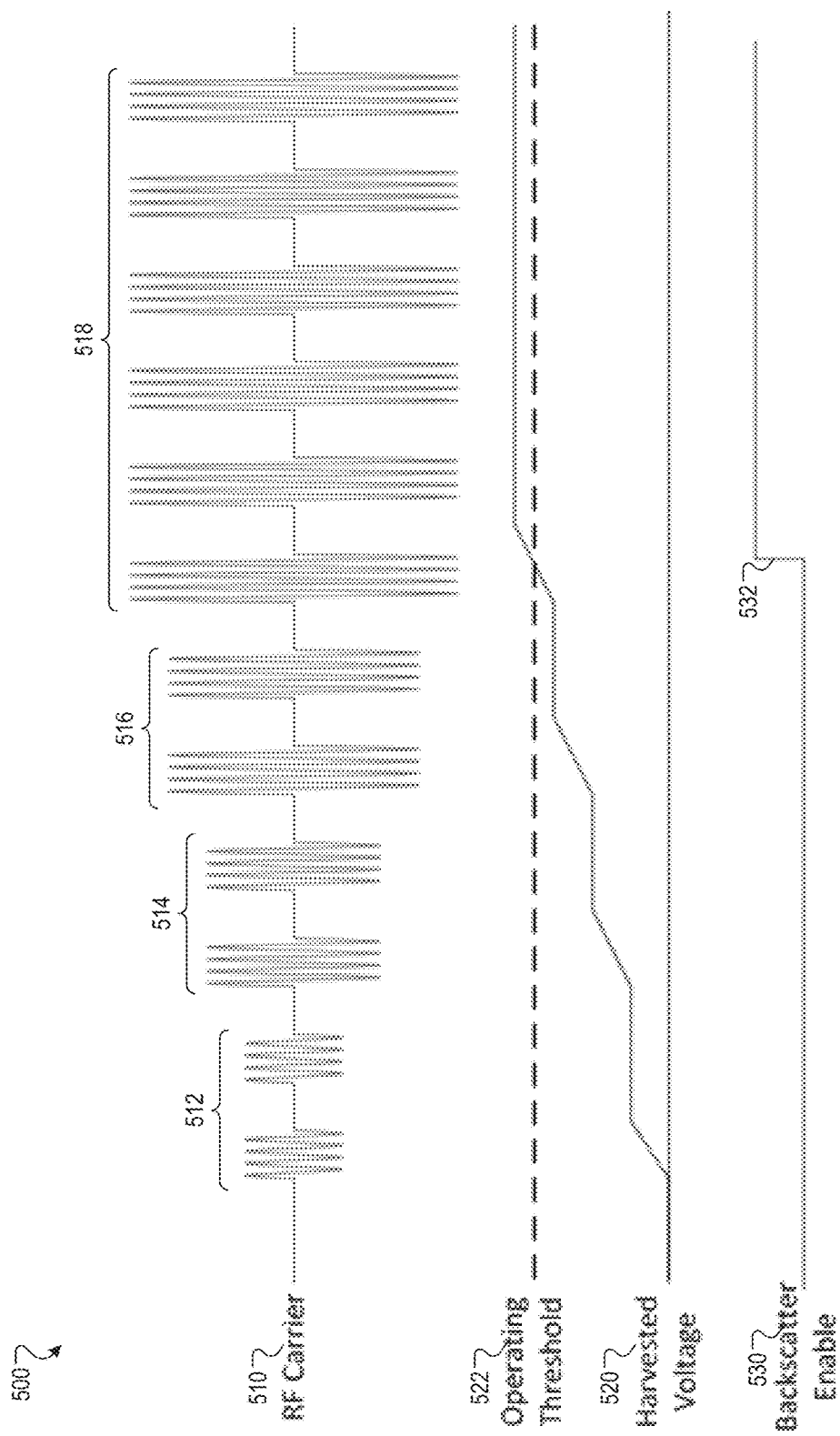
FIG. 5 illustrates an automatic gain control (AGC) algorithm for the no-wire master bridge of FIG. 1A to determine an amplitude level to transmit a signal to the no-wire slave device according to one embodiment.

FIG. 5 illustrates an automatic gain control (AGC) algorithm for the no-wire master bridge 150 of FIG. 1A to determine an amplitude level to transmit a signal to the no-wire to one-wire bridge 160 according to one embodiment. The AGC algorithm may be a closed loop power management algorithm where the output power of the no-wire master bridge 150 is controlled via feedback from the no-wire to one-wire bridge 160.

The no-wire master bridge 150 in FIG. 1A may transmit a modulated or continuous wave RF signal 510 to the no-wire to one-wire device 160. The no-wire to one-wire bridge 160 may include a rectifier to rectify the modulated or continuous wave RF signal 510 to generate energy to power the device, such as an on-chip voltage which is sufficient for chip operation. The rectifier may be integrated into the energy harvester 322 or the energy interface circuitry 320 in FIG. 3A.

The no-wire master bridge 150 may determine an amplitude to transmit the modulated or continuous wave RF signal 510 to the no-wire to one-wire bridge 160 by initially transmitting at an first amplitude and increasing the amplitude level until an ACK pulse is received. For example, the no-wire master bridge 150 may initially transmit the modulated or continuous wave RF signal 510 at a first amplitude level 512. The no-wire master bridge 150 may transmit the modulated or continuous wave RF signal 510 at a minimum threshold level 512 for a threshold period of time or until the no-wire to one-wire bridge 160 reflects a backscatter sequence, such as an ACK pulse, to the no-wire master bridge 150.

The no-wire to one-wire bridge 160 may reflect back the ACK pulse to the no-wire master bridge 150 when the power 520 harvested from the modulated or continuous wave RF signal 510 exceeds a minimum threshold level 522 (also referred to as an operating threshold) needed for the no-wire to one-wire bridge 160 to operate. In one embodiment, the minimum threshold level 522 may be a level where an energy harvester of the no-wire to one-wire bridge 160 may harvest approximately 1.6V.

When the no-wire master bridge 150 does not receive an ACK pulse within the threshold period of time, the no-wire master bridge 150 may increase the amplitude of the no-wire master bridge 150 modulated or continuous wave RF signal 510 to a second amplitude level 514. The no-wire master bridge 150 may continue to increase the amplitudes of the no-wire master bridge 150 modulated or continuous wave RF signal 510 (516 and 518) until the minimum threshold level 522 needed for the no-wire to one-wire bridge 160 to operate is reached. In one embodiment, the no-wire master bridge 150 includes a bandgap generator to set the minimum threshold level 522 and a comparator to compare the current amplitude of the modulated or continuous wave RF signal 510 to the minimum threshold level 522 and determine when the minimum threshold level 522 is reached. In another example, the no-wire master bridge 150 uses the POR, as discussed below, to ensure a nominal supply level exists. In one embodiment, the comparator may be an analog comparator that measures a divided replica of the harvested energy versus a reference threshold. The reference threshold may be from a bandgap reference.

In another embodiment, the no-wire master bridge 150 includes a voltage controlled oscillator (VCO) to determine when the current amplitude of the modulated or continuous wave RF signal 510 to the minimum threshold level 522 and determine when the minimum threshold level 522 is reached. When the switching rate of the backscatter, as dictated by the VCO rate, matches the expectations of the no-wire master bridge 150, the proper operating level will have been established.

In response to reaching the minimum threshold level 522, the no-wire to one-wire bridge 160 may begin to operate and a generate backscatter 530. When the backscatter is generated at 532, the no-wire to one-wire bridge 160 may reflect or backscatter the modulated or continuous wave RF signal 510 to send the ACK pulse. When employed in an RFID system, the AGC algorithm may manage an amount of power used to communicate signals and eliminate or reduce power management systems in an integrated circuit of the RFID slave. In one embodiment, backscattering the signal may reduce the RF field present at the no-wire to one-wire bridge. The no-wire master bridge may modulate at a 50% level to mimic the reduction of the RF field. For example, when in operation, the no-wire master bridge may communicate a binary message by transmitting the modulated or continuous wave RF signal to communicate a one value and ceasing to transmit the signal to communicate a zero value. When the signal includes a binary message with an even number of 1s and 0s, the modulated or continuous wave RF signal is transmitting half the time and not transmitting the other half the time to communicate a message. In one implementation, the no-wire master bridge may transmit and cease to transmit the modulated or continuous wave RF signal according to a model of a data transmission. In another implementation, the no-wire master bridge may transmit the modulated or continuous wave RF signal by transmitting the modulated or continuous wave RF signal at a reduced level of 50 percent.

FIG. 6 depicts a flow diagram of one example of a method 600 for determining a timing window to communicate a no-wire format from communication in an RFID system according to one embodiment. The method 600 may be performed by processing logic that may include hardware (circuitry, dedicated logic, etc.), computer programs (such that is run on a general-purpose computer system or a dedicated machine), or a combination of both. The method 600 may be performed in all or in part by the no-wire master bridge 150, the no-wire to one-wire bridge 160, the interface circuitry 310, the energy interface circuitry 320, or the processing circuitry 330 of FIG. 1A-3B.

At block 610, a processing device may receive the modulated or continuous wave RF signal received on the first pin from the master device. At block 620, the processing device may convert a bit stream of the modulated or continuous wave RF signal from a no-wire format to a one-wire format. At block 630, the processing device may communicate the bit stream in the one-wire format on the second pin to a one-wire device on a one-wire bus. At block 640, the processing device may determine a timing window to communicate response data with the master device. At block 650, the processing device may reflect the modulated or continuous wave RF signal using a backscatter technique to communicate the response data to the master device within the timing window.

Figure 7:
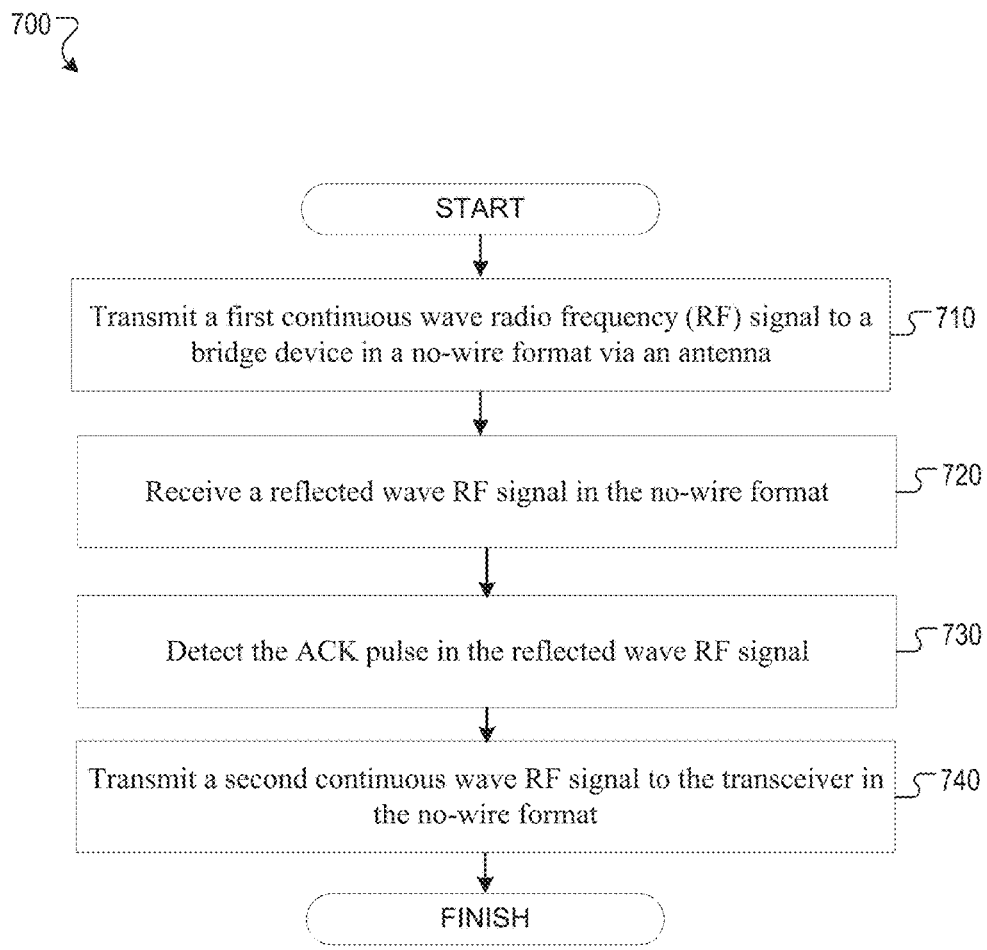
FIG. 7 depicts a flow diagram of one example of a method for determining an amplitude for the no-wire master bridge of FIG. 1 to transmit signals to the no-wire to one-wire bridge 160 according to one embodiment.

FIG. 7 depicts a flow diagram of one example of a method 700 for determining an amplitude for the no-wire master bridge 150 of FIG. 1 to transmit signals to the no-wire to one-wire bridge 160 according to one embodiment. The method 700 may be performed by processing logic that may include hardware (circuitry, dedicated logic, etc.), computer programs (such that is run on a general-purpose computer system or a dedicated machine), or a combination of both. The method 700 may be performed in all or in part by the no-wire master bridge 150, the no-wire to one-wire bridge 160, the interface circuitry 310, the energy interface circuitry 320, or the processing circuitry 330 of FIG. 1A-3B.

At block 710, a transceiver may transmit a first continuous wave RF signal to a bridge in a no-wire format via an antenna, where the transceiver is to start transmitting the modulated or continuous wave RF signal at a first amplitude value and increase an amplitude of the modulated or continuous wave RF signal to a second amplitude value at which an ACK pulse is detected. At block 720, the transceiver may receive a reflected wave RF signal in the no-wire format, wherein the reflected wave RF signal is a portion of the first modulated or continuous wave RF signal that is backscattered by the bridge. At block 730, a processing device may detect the ACK pulse in the reflected wave RF signal. At block 740, the processing device may transmit a second modulated or continuous wave RF signal to the transceiver in the no-wire format, wherein the transceiver is to transmit the second modulated or continuous wave RF signal at the second amplitude value at which the ACK pulse is detected.

Figure 8:
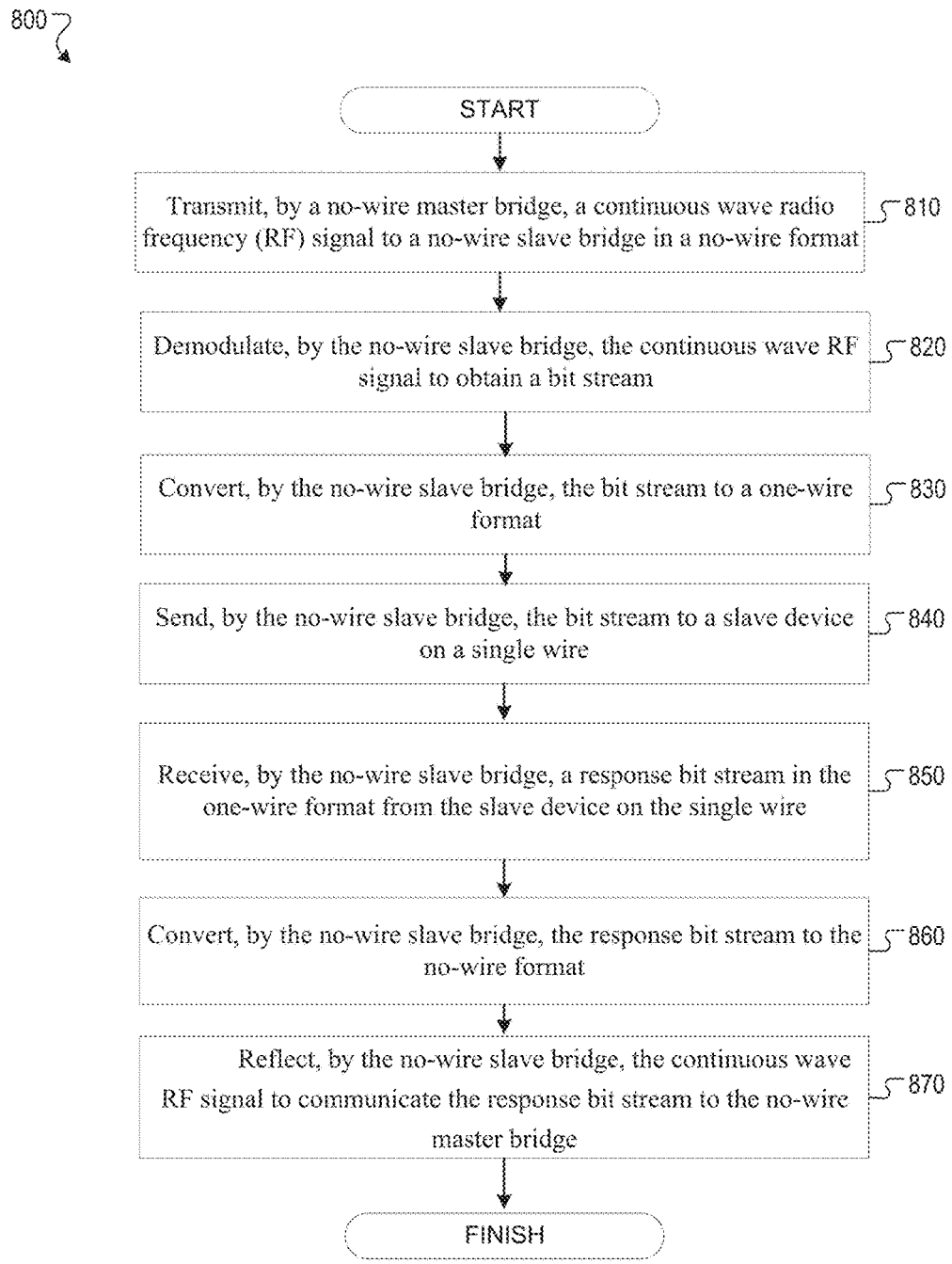
FIG. 8 depicts a flow diagram of one example of a method for converting a signal between a one-wire format and a no-wire format from communication in an RFID system according to one embodiment

FIG. 8 depicts a flow diagram of one example of a method 800 for converting a signal between a one-wire format and a no-wire format from communication in an RFID system according to one embodiment. The method 800 may be performed by processing logic that may include hardware (circuitry, dedicated logic, etc.), computer programs (such that is run on a general-purpose computer system or a dedicated machine), or a combination of both. The method 800 may be performed in all or in part by the no-wire master bridge 150, the no-wire to one-wire bridge 160, the interface circuitry 310, the energy interface circuitry 320, or the processing circuitry 330 of FIG. 1A-3B.

At block 810, a no-wire master bridge may transmit a continuous wave RF signal to a no-wire to one-wire bridge in a no-wire format. At block 820, the no-wire to one-wire bridge may demodulate the modulated or continuous wave RF signal to obtain a bit stream. At block 830, the no-wire to one-wire bridge may convert the bit stream to a one-wire format. At block 840, the no-wire to one-wire bridge may send the bit stream to a slave device on a single wire. At block 850, the no-wire to one-wire bridge may receive a response bit stream in the one-wire format from the slave device on the single wire. At block 860, the no-wire to one-wire bridge may convert the response bit stream to the no-wire format. At block 860, the no-wire to one-wire bridge may reflect the modulated or continuous wave RF signal to communicate the response bit stream to the no-wire master bridge.

In one exemplary embodiment, the processing device may be the Programmable System on a Chip (PSoC®) processing device, developed by Cypress Semiconductor Corporation, San Jose, Calif. Alternatively, processing device may be one or more other processing devices known by those of ordinary skill in the art, such as a microprocessor or central processing unit, a controller, special-purpose processor, digital signal processor (DSP), an application-specific integrated circuit (ASIC), a field-programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the common buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. The terms "first," "second," "third," "fourth," etc. as used herein are meant as labels to distinguish among different elements and may not necessarily have an ordinal meaning according to their numerical designation.

The above description sets forth numerous specific details such as examples of specific systems, components, methods, and so forth, in order to provide an understanding of several embodiments of the present invention. It may be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

What is claimed is:

1. A radio frequency identification (RFID) integrated circuit comprising:
   a first pin and a second pin;
   an energy interface circuit coupled to the first pin, the energy interface circuit to harvest energy from a modulated or continuous wave radio frequency (RF) signal received on the first pin from a master device;
   a demodulator coupled to the first pin, the demodulator to extract a bit stream from the modulated or continuous wave RF signal;
   an interface circuitry coupled to the first pin and the second pin, the interface circuitry having a port controller to forward the bit stream to a state machine;
   the state machine coupled to the interface circuitry, the state machine to:
   receive the modulated or continuous wave RF signal received from the port controller;
   convert the bit stream of the modulated or continuous wave RF signal from a no-wire format to a one-wire format; and
   communicate the bit stream in the one-wire format on the second pin to a one-wire device on a one-wire bus;
   decode the bit stream to determine an instruction; and
   execute the instruction to cause the port controller to reflect the signal to the master device in order to communicate response data.

2. The RFID integrated circuit of claim 1, wherein the state machine is further to:
   determine a timing window to communicate response data with the master device; and
   reflect the modulated or continuous wave RF signal using a backscatter technique to communicate the response data to the master device within the timing window.

3. The RFID integrated circuit of claim 1, wherein the state machine is further to reflect the modulated or continuous wave RF signal to backscatter an acknowledge (ACK) pulse to the master device, wherein the ACK pulse indicates a completion of a power-on reset (POR) process.

4. The RFID integrated circuit of claim 1, wherein the state machine is further to:
   receive, on the one-wire bus, a response in the one-wire format from the one-wire device; and
   convert the response to from the one-wire format to the no-wire format.

5. The RFID integrated circuit of claim 1, wherein the state machine further comprises:
   a memory controller coupled to the state machine, the memory controller to determine a location in a memory device to store or read data associated with the execution of the instruction; and
   the memory device to store the data.

6. The RFID integrated circuit of claim 1, wherein:
   the state machine further comprises a low-power oscillator or one or more low-power delay elements to determine a starting point of a timing window, wherein the low-power oscillator or one or more low-power delay elements oscillate at a frequency that correlates to a voltage; and the port controller is to define the timing window as a period of time beginning at the starting point for the timing window.

7. The RFID integrated circuit of claim 1, wherein the instruction is at least one of an instruction to determine an address match, an instruction to store data, or an instruction to retrieve data from a memory and communicate the response data to the master device.

8. The RFID integrated circuit of claim 1, wherein the no-wire format is a format to communicate data wirelessly between the RFID system and the master device and the one-wire format is a format to communicate data over a single wire between the RFID system and a slave device.

9. The RFID integrated circuit of claim 1, further comprising a ferroelectric random access memory (F-RAM) device coupled to store the bit stream, wherein the F-RAM device is gamma radiation tolerant.

10. A method comprising:
receiving, by an interface circuitry having a port controller, a modulated or continuous wave radio frequency (RF) signal from a master device, wherein the interface circuitry is coupled to the first pin and a second pin;
harvesting, by an energy interface circuit coupled to a first pin, energy from the modulated or continuous wave RF signal;
extracting, by a demodulator coupled to the first pin, a bit stream from the modulated or continuous wave RF signal;
forwarding, by the port controller, the bit stream to a state machine coupled to the interface circuitry,
converting, by the state machine, the bit stream of the modulated or continuous wave RF signal from a no-wire format to a one-wire format;
communicating, by the state machine, the bit stream in the one-wire format to a one-wire device on one-wire;
decoding, by the state machine, the bit stream to determine an instruction; and
executing, by the state machine, the instruction to cause the port controller to reflect the signal to the master device in order to communicate response data.

11. The method of claim 10, further comprising:
receiving, by the state machine, the modulated or continuous wave RF signal at a threshold amplitude value to operate the processing circuitry;
rectifying, by the state machine, a voltage from the modulated or continuous wave RF signal; and
in response to receiving the modulated or continuous wave RF signal at the threshold amplitude value, backscattering the modulated or continuous wave RF signal to send an ACK pulse to a no-wire master bridge, wherein the voltage correlates to an oscillating frequency that sets a timing window to backscatter the modulated or continuous wave RF signal.

12. The method of claim 10, further comprising:
rectifying, by the state machine, no-wire to one-wire bridge, a voltage from the continuous wave RF signal; and
communicating an ACK pulse to a no-wire master bridge when the voltage exceeds an operating threshold.

13. The method of claim 12, further comprising performing, by the state machine, a power-on reset (POR) process when the voltage exceeds the operating threshold.

14. A radio frequency identification (RFID) system comprising:
a one-wire bus;
a one-wire device coupled to the one-wire bus; and
an RFID integrated circuit coupled to the one-wire bus, the RFID integrated circuit comprising:
a first pin and a second pin;
an energy interface circuit coupled to the first pin, the energy interface circuit to harvest energy from a modulated or continuous wave radio frequency (RF) signal received on the first pin from a master device;
a demodulator coupled to the first pin, the demodulator to extract a bit stream from the modulated or continuous wave RF signal;
an interface circuitry coupled to the first pin and the second pin, the interface circuitry having a port controller to forward the bit stream to a state machine;
the state machine coupled to interface circuitry, the state machine to:
receive the modulated or continuous wave RF signal received from the port controller;
convert the bit stream of the modulated or continuous wave RF signal from a no-wire format to a one-wire format; and
communicate the bit stream in the one-wire format on the second pin to the one-wire device on the one-wire bus;
receive a response in the one-wire format from the one-wire device via the one-wire bus;
decode the bit stream to determine an instruction; and
execute the instruction to cause the port controller to reflect the signal to the master device in order to communicate response data.

* * * * *